United States Patent
Gauvreau, Jr. et al.

(10) Patent No.: US 11,301,463 B1
(45) Date of Patent: Apr. 12, 2022

(54) MULTI-VERSION DATABASE MANAGEMENT SYSTEM

(71) Applicant: BlockPoint Systems Inc., Rancho Santa Fe, CA (US)

(72) Inventors: Paul Richard Gauvreau, Jr., Rancho Santa Fe, CA (US); Cassidy Jacob Mountjoy, Solana Beach, CA (US)

(73) Assignee: BLOCKPOINT SYSTEMS INC., Rancho Santa Fe, CA (US)

( * ) Notice: Subject to any disclaimer, the term of this patent is extended or adjusted under 35 U.S.C. 154(b) by 0 days.

(21) Appl. No.: 17/497,369

(22) Filed: Oct. 8, 2021

Related U.S. Application Data

(60) Provisional application No. 63/090,058, filed on Oct. 9, 2020.

(51) Int. Cl.
*G06F 16/23* (2019.01)
*G06F 16/21* (2019.01)

(52) U.S. Cl.
CPC ........ *G06F 16/2379* (2019.01); *G06F 16/219* (2019.01); *G06F 16/2365* (2019.01)

(58) Field of Classification Search
CPC . G06F 16/2365; G06F 16/2379; G06F 16/219
USPC ....................................................... 707/703
See application file for complete search history.

(56) References Cited

U.S. PATENT DOCUMENTS

| | | | | |
|---|---|---|---|---|
| 10,880,073 B2* | 12/2020 | Hwang | ............ | H04L 63/10 |
| 2020/0034353 A1* | 1/2020 | Innocenti | ............ | G06F 16/2365 |
| 2020/0065300 A1* | 2/2020 | Yang | ............ | G06F 16/27 |
| 2020/0127842 A1* | 4/2020 | Winarski | ............ | H04N 21/2347 |
| 2020/0273133 A1* | 8/2020 | Morris | ............ | G06Q 10/06316 |
| 2021/0034606 A1* | 2/2021 | Stamos | ............ | G06F 16/211 |
| 2021/0234669 A1* | 7/2021 | Singh | ............ | H04L 9/0637 |

* cited by examiner

*Primary Examiner* — James Trujillo
*Assistant Examiner* — Fariborz Khoshnoodi
(74) *Attorney, Agent, or Firm* — Nicholson De Vos Webster & Elliott LLP

(57) ABSTRACT

A multi-version database includes user-defined blockchain containers, where each of the user-defined blockchain containers is configured based on a type of data to be stored in a corresponding user-defined blockchain container. Each of the user-defined blockchain containers includes a set of one or more fields defined by a user. A command to write data to the multi-version database is received, where the command includes an identification of a first blockchain container of the user-defined blockchain containers, an identification of at least one of the set of one or more fields of the first blockchain container, and a value to write for at least one field of the set of one or more fields. A record is generated for the first blockchain container, the record including the value to write for the at least one field. A current state of the first blockchain container is then updated to include the record.

21 Claims, 8 Drawing Sheets

MULTI-VERSION DATABASE MANAGEMENT SYSTEM

CROSS-REFERENCE TO RELATED APPLICATIONS

This application claims the benefit of U.S. Provisional Application No. 63/090,058, filed Oct. 9, 2020, which is hereby incorporated by reference.

FIELD

Embodiments of the invention relate to the field of data storage using databases; and more specifically, to a multi-version database.

BACKGROUND

There have been astronomical advances in computer technology. Moore's law has modeled a revolution in hardware, while algorithms and number theory have shaped software development and driven various advancements in logic-based performance Databases continue to provide a means of connecting the two.

Databases are a tool for efficiently accessing and querying data on a computer and a means of storing and recovering the state of a system from disk. Databases play a key role in abstracting away the need to deal with hardware reliability and enable a simple interface for efficiently storing data. A database management system (DBMS) is software that can interact with users, applications, and databases to capture and analyze the data stored in databases. Traditional DBMS and relational databases use tables to store such data. These tables allow for the performance of basic usage patterns using Structured Query Language (SQL) to enable an application to mutate the state of the database: inserts, updates, and deletes. However, as various fields have emerged and/or evolved, there has been little advancement in the structure of traditional DBMS and relational databases, forcing ad-hoc solutions and middleware to be built around DBMS. These non-native solutions are inefficient and increase the load on internal development, adding more items into a user's stack. Further, these non-native solutions increase the points of entry into software, increasing the overall risk and vulnerabilities associated with these systems.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
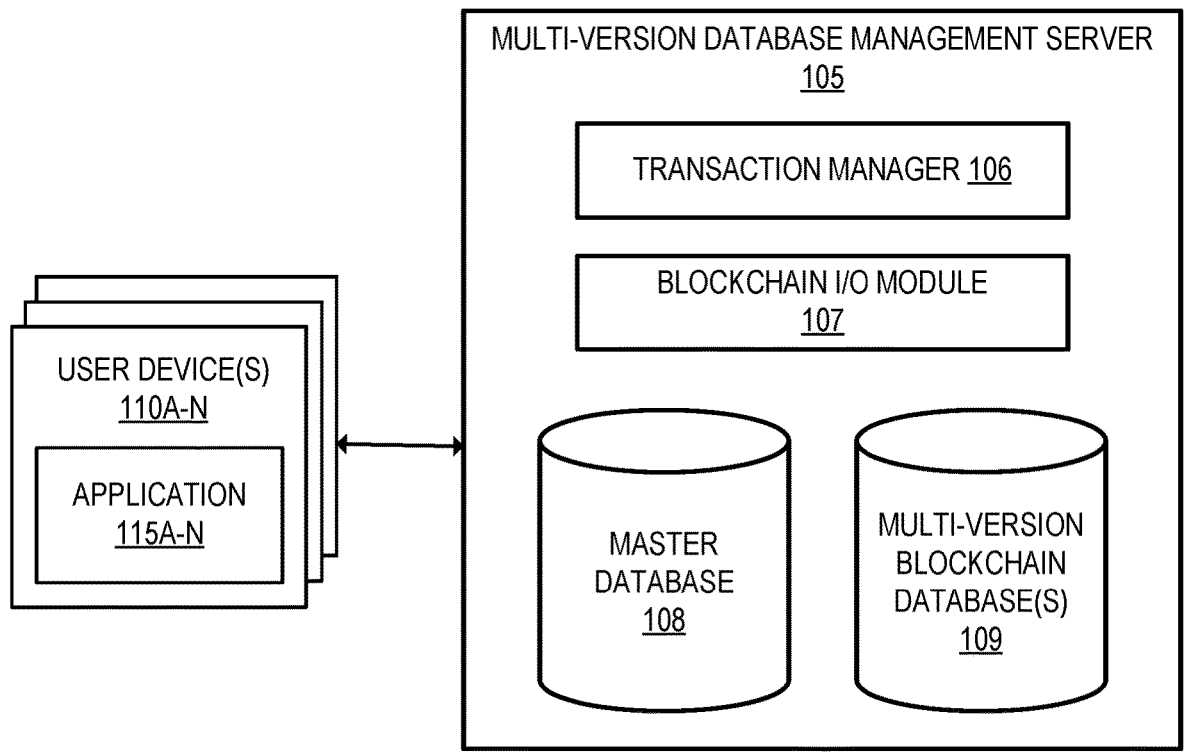
FIG. 1 illustrates an exemplary system according to some embodiments described herein.

A multi-version database (MDB) management system that utilizes blockchain principles to provide immutability, security, and authentication of data is described. The MDB management system may be a high-performance relational database with built-in blockchain immutability and validity tracking.

In this modern day and age, immutability, validity tracking, mutation history, and fine-grained permissions should be mandatory for all data systems. Applications are at an increasing risk for adversarial attacks and adopting certain blockchain principles can mitigate such risks. For example, the digitalization of financial and healthcare-based industries has resulted in an increase in the electronic storage of highly sensitive information. These types of highly sensitive information are best handled responsibly to prevent their accessibility to hackers, and the integration of blockchain technology can mitigate potential security risks.

Conventional solutions support basic, makeshift versioning tables that have major performance implications. Conventional database management systems have a rigid, universal structure for storing data that lack specificity and provide a one size fits all regardless of the type of data to be stored. This results in inefficiencies. These conventional solutions are also not designed to scale, lack security, and lack immutability and validity tracking (e.g., auditability).

Other solutions include noSQL, which is a non-relational database management system that forgoes the use of structured tables. While noSQL solutions can eliminate data pre-processing and optimize database writes, on the other hand, noSQL databases take a large performance hit when accessing and aggregating data sets, promote data-bloating, and lack intuitive data dependencies. When structure is not enforced, data loses specificity and pre-processing is overlooked. Subsequently, when making use of their unstructured data, users have to write complex code to clean and aggregate data when running analytics. Thus, while noSQL provides an optimal solution for data with a high transaction load, such systems overlook data usability and the structured benefits provided by traditional SQL systems.

Further, in many cases, traditionally optimized applications will have multiple DBMs (SQL and noSQL) to handle their data pipelines. This improvised solution promotes redundant data, tangled middleware, and high network traffic. Overall, increased hosting and development costs reflect these overly complex design choices.

In contrast, embodiments describe herein provide many technical advantages and improvements, in addition to addressing the deficiencies of previous solutions. For example, embodiments are built on a blockchain foundation and adopt many key cryptographic features. Like a blockchain, data in the MDB management system is hashed and linked. Unlike a peer-to-peer blockchain, data is not publicly distributed across machines. Data in the bSQL is never physically deleted or overwritten, instead append-only data is added to the blockchain. Utilizing blockchain principles for the MDB management system containers provides a number of advantages and improvements over traditional DBMS. For example, in the MDB management system, data cannot be illicitly changed, record history can be proven for audits, and all versions of the database are available at any point in time.

Additionally, embodiments maintain an adoptable relational structure and an intuitive interface language, making them immutable, fully auditable, secure, as well as adoptable and applicable to a wide variety of applications.

FIG. 1 illustrates an exemplary system according to some embodiments described herein. The system illustrated in FIG. 1 includes multi-version database management server 105 and one or more user devices 110A-N. Although FIG. 1 is illustrated showing the multi-version database management server 105 using a blockchain database (e.g., multi-version blockchain database(s) 109), other embodiments, can use non-blockchain-based tables and be multi-version or non-multi-version.

Examples of user devices 110A-N include computing devices (e.g., laptops, workstations, smartphones, palm tops, mobile phones, tablets, gaming systems, set top boxes, wearable devices, electronic devices, etc.) that are capable of transmitting and/or receiving network traffic. In one embodiment, each of user devices 110A-N executes an application 115A-N that is capable of transmitting and/or receiving network traffic. For example, the client network application 110A-N may be a web browser or other application that is capable of transmitting commands to and/or receiving responses to multi-version database management server 105.

Multi-version database management server 105 includes a transaction manager 106, a blockchain I/O module 107, a master database 108, and a multi-version blockchain database(s) 109.

In one embodiment, transaction manager 106 is configured to receive commands from user devices 110A-N. In one embodiment, transaction manager 106 receives the commands from one or more user devices 110A-N via an application programming interface (API). The commands allow a user of a user device (e.g., user device 110A) to initiate various operations with respect to the multi-version database management server 105, including creating a multi-version blockchain database (e.g., in multi-version blockchain database(s) 109) and performing mutations to insert, amend and/or discontinue data in a multi-version blockchain database.

In one embodiment, blockchain I/O module 107 is configured to process read and write operations on blockchains in multi-version blockchain database(s) 109 in response to commands received by transaction manager 106. In one embodiment, blockchain I/O module 107 performs low-level blockchain operations including creating a new blockchain database, creating new blockchain containers having particular container types, persisting to memory and storage, in addition to performing mutations (e.g., adding, amending, and/or discontinuing) on blockchain containers.

In one embodiment, multi-version blockchain database(s) 109 is structured as a collection of individual blockchain containers, where each blockchain container is a data structure that can be configured for a specified data type. The blockchain containers can be referred to as containers or tables. In some embodiments, the multi-version database management server 105 can include multiple user-defined multi-version blockchain database(s) 109. The multi-version database management server 105 can also contain a master database 108 that is used to describe and permission access to the individual multi-version blockchain database(s) 109 in the database management system 105.

Figure 2A:
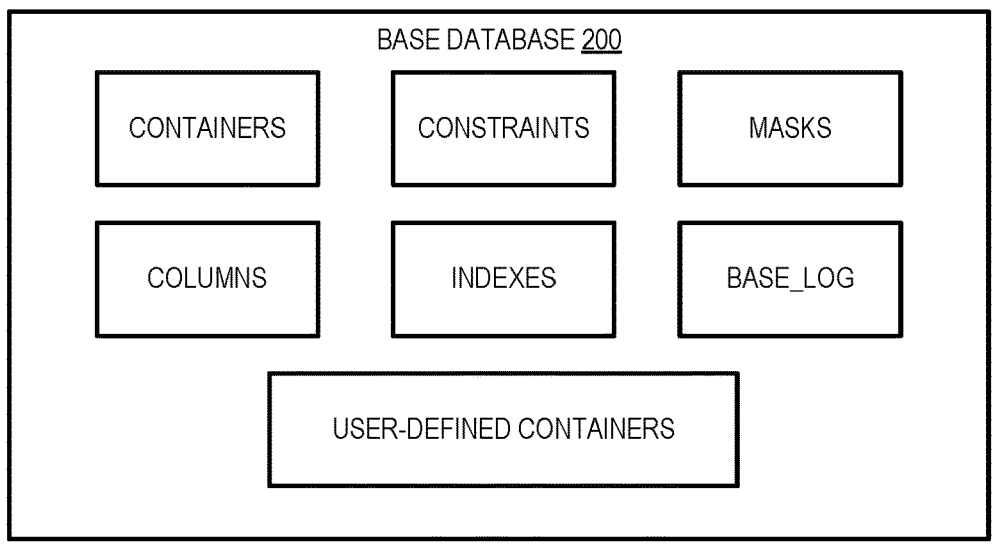
FIGS. 2A-B illustrate an exemplary database schema of a multi-version database management system according to an embodiment.
Figure 2A:
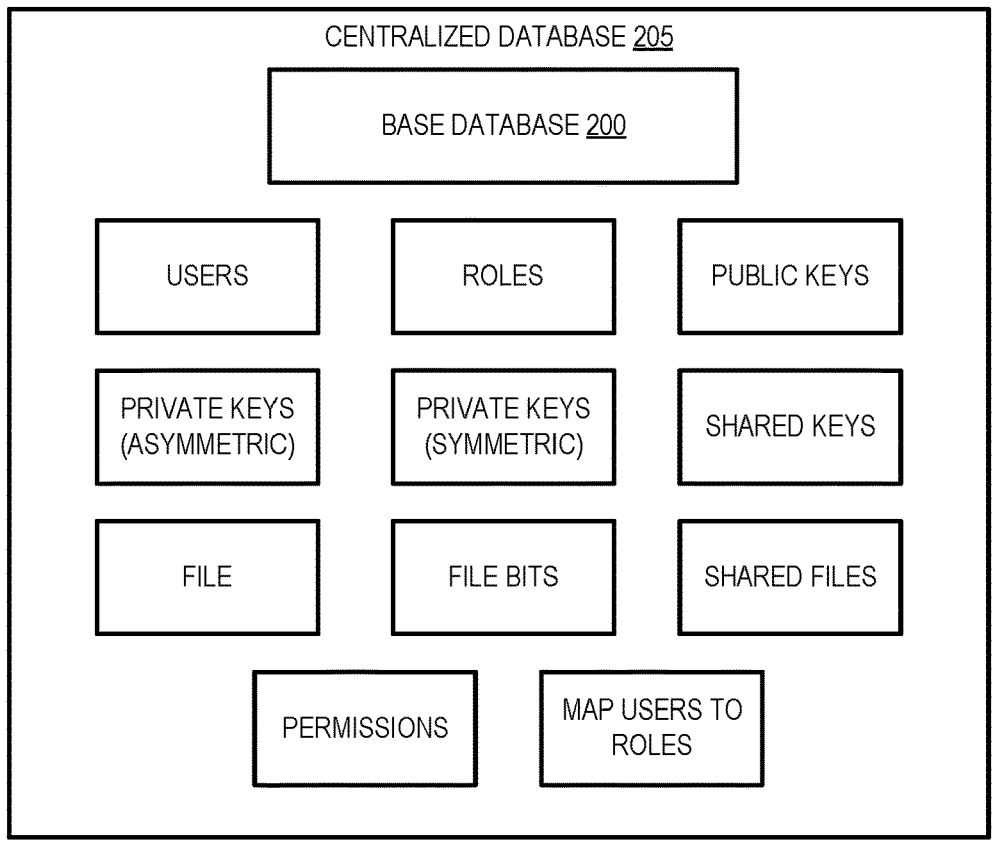
Figure 2B:
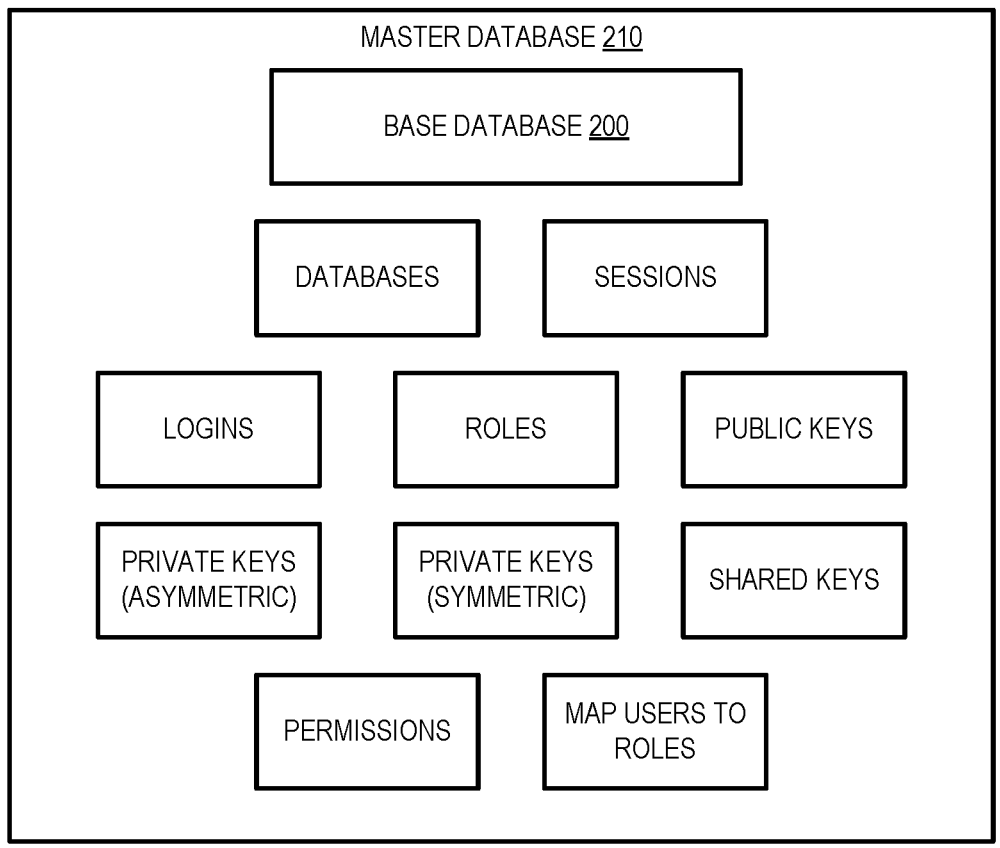

FIGS. 2A-B illustrate an exemplary database schema of a multi-version database management system according to an embodiment. In some embodiments, in addition to basic transaction management, an MDB management server (e.g., the MDB management server 105) includes a series of self-describing system containers that enable it to startup and perform various recovery protocols. As illustrated in FIGS. 2A-B, the MDB management server can include a plurality of system containers that the MDB management server can use to serialize and deserialize the system from disk. In some embodiments, there are three main types of databases: base databases (e.g., base database 200), centralized databases (e.g., centralized database 205), and master databases (e.g., master database 210). The base database 200 handles user-defined containers and their metadata. This includes all read/write operations as well as recovery from fatal system crashes. The centralized database 205 stores additional system containers required to administrate, permission, and carry out transactions performed in a user-defined database. The master database 210 is a system-managed database that describes and permissions all centralized databases in the MDB management system. For example, when a transaction is received, the transaction is first validated by the master database 210 and sent to the corresponding centralized database 205. After the centralized database 205 validates the transaction, the corresponding operation is carried out in the base database 200. The centralized database 205 then returns the response to the master database 210.

In some embodiments, a given MDB management system includes only one master database 210 and all user-defined databases are centralized databases 205, were the master database 210 and the centralize databases 205 each include a base database 200. In some embodiments, the base database 200 serves as a common set of tables that is used in the centralized and master databases.

I. Blockchains

The MDB management system utilizes blockchain principles to provide immutability, security, and authentication of data. The MDB management system accomplishes this through the use of containers to store the data. In some embodiment, the containers, which can also be referred to as blockchain containers, are data structures that utilizes blockchain principles to store records containing data. A blockchain is a chain of blocks used to store data/records in an immutable and secure manner Each block in the blockchain can be traced back to a previous block in the chain using the hash of the previous block and the data stored in the current block. Once recorded, the data in any given block cannot be altered retroactively without alterations to all subsequent blocks in the blockchain. Typical blockchains are used to record transactions involving cryptocurrencies, smart contracts, non-fungible tokens (NFTs), etc. Typical implementations of blockchain technology are stand-alone, independent solutions for their own blockchain. They do not reference foreign blockchains nor do they provide the capacity to do so. They utilize mathematical hashes of their data and a community consensus of blockchain miners to prove authenticity of their data and maintain immutability. They do not share mathematical hashes nor provide for foreign blockchain hashes to be cross-referenced or included in their blockchains, nor do they allow for their miners to provide outside consensus for other blockchains or vice versa.

Blockchain emerged as a means of building a distributed, law-less, ledger-based system for carrying out financial transactions. The blockchain solution provided a method in which inflation and currency distribution could be programmatically regulated, transactions could be carried out privately and independently from any third party, and records could be stored in an immutable and secure fashion. Ultimately, blockchain questioned the sophistication of current software implementations. Blockchain served as a composition of old technologies to solve a new problem: establishing decentralized trust and building immutable records in the public domain. The blockchain movement revolutionized the perception of data storage and continues to drive a demand for features like immutability, proof-of-correctness, and auditability.

Blockchain technology exposed a range of holes in traditional data storage programs and lacks an enterprise level solution. For example, current databases are unable to monitor the validity of their data, analyze who has interacted with that data, and provide an infrastructure in which privacy is pushed down to the user opposed to being managed by the administrator. In addition, current blockchain systems use brute force-based cryptography procedures that require an immense amount of computers and dedicated hardware, making private blockchain applications costly for businesses to adopt and often insecure.

The MDB management system uses foundational blockchain technology and security principles to build a relational database that is immutable, fully auditable, and ledger-based. Using a blockchain at the core of the MDB management system serves as the enterprise solution for incorporating blockchain into applications that provides an abstraction for working with records in an immutable setting and heightens application insights.

The MDB management system allows for the immutability of data, system-managed keys, and validity checks. In some embodiments, write-only files locked by an operating system (OS) provide a preliminary barrier that an attacker would have to surpass in order to edit the flat files on disk. The MDB management system can be implemented using a blockchain SQL (bSQL) interfacing language. In some embodiment, bSQL commands only support pseudo-mutations (e.g., insert, amend, discontinue, etc.), preserving the history of the system and requiring attackers to interface with the flat files directly. In some embodiments, system-managed keys prevent an administrator from having heightened permissions in comparison with a traditional adversarial system. In some embodiments, system-managed keys are required to sign and track the validity of a given page that references a block of data in memory. A page is the smallest unit of space on a disk drive (SSD or HD) that a computer can write in one operation.

In some embodiments, the MDB management system uses a system of shadow pages and an immutable archive to keep recovery functionality while maximizing the security of committed data. New data pages are stored in sequential shadow pages. In some embodiments, shadow pages are written to the archive when: (1) the shard being committed has n shadow pages and n>1; (2) there exists a shadow page with an identifier "x" that contains the oldest uncommitted transaction. If there are no uncommitted transactions x=n−1; AND (3) y pages are written to the archive when there exists shadow pages y<x.

In some embodiments, the purpose of the shadow page is to provide a staging period for a transaction to be able to be rolled back prior to being committed and sealed to the container's historical log. Once a page is persisted to the archive from the shadow pages, writes can never again be performed on that data. This allows those archive files to be permissioned as write only data files.

Data pages that are filled before the oldest uncommitted transaction are considered safe because a recovery or roll-back will not modify these pages. Consequently, shadow pages are stored in files that allow read and write operations. Furthermore, the archive uses append-only files to store archived data. These files allow read operations, but write operations are limited to only adding new data—they are not allowed to modify existing data. This prevents OS users from modifying archive files manually using their OS permissions.

II. Containers

The MDB management system stores data in containers (e.g., data structures storing the data as records inserted into a blockchain). In some embodiments, the MDB management system containers are similar to SQL tables. However, while traditional SQL only uses one table that maintains a rigid insert, update, and delete structure, the MDB management system includes a set of different container types that enable users to optimize and modularize their database based on various data sources and usage patterns. In one embodiment, a data source is defined by a regular pattern in which the data is inserted, amended, and discontinued in the database. In some embodiments, the MDB management system provides a range of structured containers to provide users with a flexible toolkit when designing data-driven applications. For example, containers of the MDB management system can be optimized for different transaction patterns and simplify data-driven applications with enhanced security.

Conventional database management systems provide a rigid, universal structure for storing data that is inefficient with its lack of specificity for handling given data. However, the MDB management system described herein allows for increased performance by providing specialized containers that can be optimized for a given use case based on the type of data and expected usage patterns. For example, for systems that are more space conscious and less performance demanding, user can choose containers that optimize for space, while for systems that are seeking to optimize performance, users can choose containers that store additional meta-data that increases performance and post-processing. Further, in container types that store additional data metrics, users can perform record-specific query predictions, which can increase performance and create a uniform load distribution.

a. Container Types

In one embodiment, the MDB management system includes the following container types: historical, historical plus, traditional, and sparse. In other embodiments, the MDB management system can include fewer, additional, and/or different container types. In some embodiments, the MDB management system containers are blockchain containers that use cryptographic procedures to enforce and track record validity. In other embodiments, the containers are light weight data structures for maintaining serializability of data to and from disk. The containers are write only, and use cryptographic signatures and HMACs to track page integrity.

Blockchain containers can be characterized by the following features: pseudo-mutability (e.g., the state of a blockchain can be changed, but the history of data in the blockchain can never be overwritten) and atomic mutations (e.g., indivisible and irreducible mutations prevent partial writes to the blockchain). Blockchain containers are also query compatible through the use of performance enhancing commands The MDB management system containers can serve as a layer of abstraction between the user and how the data is stored and queried. In some embodiments, this abstraction layer enables the MDB management system to provide various protocols and blockchain container types that enable users to choose how data is stored in the database and its corresponding metadata. This allows for various optimizations to be realized at the database level, as opposed to the database interfacing level. The MDB management system containers can be further optimized by users based on how the data is to be inserted and queried, the amount of resources users want to allocate for the application, and for different performance requirements.

Each MDB management system container can be associated with a ledger-like storage protocol. For example, the MDB management system container can include an append only historical log that tracks all records and modifications and does not allow data to be deleted. The different containers can serve as abstraction barriers in which they are interacted with, and the system alters the underlying structure respective to the container type. This modularity of storage protocols enables the system to optimize containers for specific data sources. For example, a historical container is a bare bones, ledger esc storage protocol for time series-based data. Historical containers do not allow primary keys and in turn do not allow updates, making it an ideal historical ledger for performing queries and mutations (e.g., insertions) on large amounts of historical data, while eliminating excess overhead. This can result in faster insertions, easier to estimate cardinalities, and more accurate record determinism.

high isolation level. Additional examples of data sources for the historical container type include market data, log files, and research data.

Historical plus containers can handle primary key dependent data and be optimized for infrequently updated data with inter-container dependencies. As illustrated in Table 1, the historical plus container type can also be ideal for frequent insertions. In some embodiments, the historical plus container is configured to use the minimal amount of space required to have referenceable primary keys without building additional meta-data optimized for version lookups. This reduces its footprint, while enabling it to be referenceable. An example data source for the historical plus container type is social media data, where social media posts are inserted once, queried many times, and are referenceable by other containers. Data points are independent from one another, meaning that updated values are not going to be in violation of concurrency protocols. This enables a user to minimize stored metadata, as rollbacks will be very uncommon.

Traditional containers can provide features, such as primary and foreign keys, as well as blockchain-specific attributes, such as time series selection, validity, and lifetime tracking. Traditional containers are configured to manage relational data while providing fast access to mutation history. As illustrated in Table 1, the traditional container

TABLE 1

| Container Types | | | | |
|---|---|---|---|---|
| CONTAINER TYPE | FREQUENT INSERTIONS | INFREQUENT INSERTIONS | FREQUENT UPDATES | INFREQUENT UPDATES |
| Historical | ✓ | | X | X |
| Historical Plus | ✓ | | | ✓ |
| Traditional | ✓ | ✓ | | ✓ |
| Sparse | | ✓ | ✓ | |

Container types can be interchangeable at the user level and each container type can provide different underlying protocols for optimizing usage and storage patterns, as well as post-processing techniques. Containers can be interchangeable in the sense that each can be interacted with and aggregated using the bSQL programming language. Containers can be specialized for different data sources and user cases.

Historical containers can be optimized for historical data collection and logging. As illustrated in Table 1, the historical container type is ideal for frequent insertions, but does not allow for updates to the stored data. In some embodiments, the historical container is a bare-bones ledger optimized for fast insert speeds, large datasets, and non-primary key dependent data. In some embodiments, the historical container stores very little system metadata. An example data source for the historical container type is time series data. For example, Internet of Things (IOT) devices are often used to source data for time series applications. IOT devices collect data and stream that information back to the datastore, which can often involve very high insertion patterns of unique data. Sensors are often running on a clock and have a very regular behavior.

Another example data source for the historical container type is monetary transactions. Sending funds is a non-editable, insert only, ledger-based usage pattern. Priorities are efficiency, security, and validity, but the information always needs to be correct. Transactions need to maintain a type can be ideal for both frequent and infrequent insertions, in addition to infrequent updates to stored data.

Traditionally when users store time series data, they have to get an entirely different DBMS to store that data in because traditional SQL databases and relational database management systems are not designed for heavy insertions and time-based queries. However, the use of containers in the MDB management system allow users to specify a historical container type which optimizes for data that is inserted frequently, but not updated. This can simplify the software stack of the application and enable that data to then be interdependent and relatable between other container types and schemas. While the container applies restrictions that prevent values from being updated and deleted, it can reduce metadata and change locking procedures and other internal parameters to optimize around the defined interaction with the container, resulting in increased performance. Thus, instead of requiring two different databases, one to store relational application information and one to store time series data, the MDB management system enables users to store both in the same database management system and still maintain the performance metrics of the two specialized, independent systems.

Sparse containers provide the same functionality as the traditional container type but can optimize storage by only storing changed values. In this manner, sparse containers can reduce storage usage at the cost of performance for rollbacks and non-state-based queries. As illustrated in Table 1, the sparse container type can also be ideal for infrequent insertions and frequent updates to stored data. An example data source for the sparse container type is electronic health records (EHRs). In one embodiment, sensitive data is audited and optimized for security.

In addition, other data sources can be applied to a plurality of container types depending on optimization goals. For example, user profiles are typically inserted once, read/accessed a plurality of times, and can be updated either frequently or infrequently, based on the application. User profile data can be stored in the traditional container type when being optimized for speed, or in the sparse container type when being optimized for storage.

In another example, different container types can be used for e-commerce data depending on a user's optimization goals. For example, the historical container type can be used for a purchases ledger where the goal is to optimize for insertions and time series analytics. However, the historical plus container type can be preferred when the e-commerce data is product metadata where the goal is to optimize for queries and updates to price, discounts, and descriptions.

In some embodiments, a filter or jurisdiction can be applied to a container. For example, a HIPAA jurisdiction can be applied to a container. Applying a jurisdiction to a container indicates to the MDB management system that the data stored in the container should be encrypted and secured so that it meets HIPAA compliance.

In some embodiments, different regions can have different data requirements. Establishing jurisdictions for different containers can allow the MDB management system to automatically apply region-specific security and encryption procedures to the data.

b. Use Case Specific Container Types

One example of a use case specific container type is a keep alive container. The keep alive container provides an interfaceable historical plus or traditional container that utilizes a user defined verification function to buffer in and commit data to the MDB management system. Un-verified information is not committed after a specified threshold is applied. The MDB management system can be set up to enable the user to expand and build additional container types to fit different needs.

In the case of a hedge fund that wants to track various risk parameters and metrics, the hedge fund needs to have current values available for clients purchasing or holding their index funds. However, to comply with SEC regulations, whenever the data is read and requested, the data must be recorded for seven years. Because millions of risk records are recorded (inserted) daily, while only under ten thousand records are read and marked to be kept, conventional systems fail to perform adequately. In these conventional systems, all other records need to be cleaned out of the system and pages need to be re-packed. This process bloats performance on the basic insert, update, delete table available from conventional systems as it falls out of their traditional usage patterns.

To address this issue, a keep alive container type can be built based on this type of usage pattern. For example, the keep alive container type can build an in-memory or on-disk staging table. The staging table can include a system-managed "keep" flag or indicator that is updated based off of a user-provided, schema-defined function. Subsequently, any time a value is read by a query in the first two hours of its life, the keep flag is marked. Otherwise, the record is removed from memory. A parallel process can also constantly manage the memory and persist only the records marked with the keep flag.

By operating in the manner described, the keep alive container conserves resources by passing the records through a staging buffer, removing the need to vacuum and perform post-processing tasks on the data. Further, audit trails can be maintained for regulatory purposes. Server load is uniform and constant throughout the day, preventing previous spikes and unpredictable delays. The keep alive container type also eliminates the need to run additional scripts and manually clean data, reducing overhead, management, and the error rate.

Another example of a use case specific container type is a middleware-less container. The purpose of a middleware-less container is to remove the need for additional middleware, enabling the data sources to connect directly to the database itself. This can reduce overhead and system management costs, while also increasing the security of the data by decreasing points of entries into the system.

In some embodiments, middleware-less containers can be configured by attaching a user-defined preprocessing function to the container. The purpose here is to enforce the normalization of data in the container while removing the need for additional middleware and server elements to perform the preprocessing. This reduces implementation complexity and enforces consistency in the stored data.

One example of a middleware-less container is a computervision table where frames can be streamed directly to the database. The database will execute the user defined identification functions, building metadata on the specific frame and storing the information. For example, the functions can identify users in a photo, the activity being performed, identify frames with a particular sport being played, etc. In such embodiments, users can query for all frames with user A in the photo or where user A is playing soccer. This enables for "serverless" preprocessing and elasticity preprocessed information.

III. Training

In some embodiments, the MDB management system provides access to unique data sets for training models and building insights. With full access to historical data in a structured and intuitive format, performing analytics can be easier and more efficient. Unlike conventional systems, time-series training data is easy to generate. In addition, users can generate training data from previous version of the database through the use of temporal queries. This enables users to test their algorithms and models on different (or additional) states of their own database.

Queries can be constructed to intuitively build training data that analyzes how changes in user data affect certain targets variables. In one embodiment, training data can be built through the bSQL query language. For example, training data can be built via the MDB management system's ability to query and access historical datapoints and record versions. One example of this could be to select all "target variables" during the temporal region in which a user had just changed data.

IV. Blockchain SQL (bSQL)

The MDB management system can be implemented using a blockchain SQL (bSQL) interfacing language. bSQL can be used to manage and query the MDB management system. In one or more embodiment, bSQL commands follow a natural language format. bSQL can follow traditional SQL languages and additionally offer multi-version and blockchain-specific commands In such embodiments, this results in an SQL compatible language with a wide range of intuitive commands The MDB management system can allow users to analyze historical aspects of their data. For example, users can query a specific point in time to view the state of the database at that specific point in time. Additionally, they can access the lifetime of a given record, analyze modifications to the record, and identify users who made the modifications. This provides users with additional insight on various usage patterns, sessions, and data segments.

a. Creating Containers Using bSQL

Using the bSQL language, a user creates one or more containers, specifying features of the containers. In one embodiment, an example format of a bSQL command to create a container (e.g., an MDB management system database object or blockchain) in a given database can be as follows:

CREATE CONTAINER
{ database_name.container_name | container_name},
<container_type> [WITHOUT STATS]
({ <column_definition> } [ , ... n] )
[INDEX { <index_definition> [ , ... n] } ]

In one or more embodiments, instead of "CREATE CONTAINER," a bSQL command to create an MDB management system database object can be expressed as "CREATE BLOCKCHAIN" or "CREATE TABLE," and result in the creation of container in the same manner. Similarly, other instances of "container" in the bSQL commands described below can be expressed with the term "blockchain" and result in the same outcome.

The "database_name" is the name of the database in which the container is to be created. In embodiments, the value of "database_name" must specify the name of an existing database. If not specified, "database_name" defaults to the current database. The value of "container_type" is the type of container to be created. If value is not specified, "container_type" defaults to Historical. The inclusion of "WITHOUT STATS" specifies that the container will not be built with statistics.

An example CREATE container command to create a sparse type container named "employee_reference" in a "main" database is as follows:

CREATE CONTAINER main.employee_reference SPARSE
(employee UINT64 PRIMARY AUTO INCREMENT [0, 1],
firstname STRING PACKED,
lastname STRING PACKED,
division UINT8 FOREIGN KEY [division, id]
);

In the example command, a number of columns labeled "firstname," "lastname," and "division" are specified. The schema for column definitions includes a column name, a data type (e.g., STRING, UINT8, etc.), and a timestamp keyword that generates a column definition with the name "timestamp" whose values are stored as the current time when the record was inserted. Columns can also be specified as being "packed," "padded," or "nullable." "Packed" specifies that the values inserted into this column don't span there default size instead they are packed and pointers to the start and end are stored in a footer. "Padded" specifies that the values inserted into this column span its default size and no footer exists. "Nullable" specifies that when a record is inserted into the container, if there is no value that corresponds to the nullable column, the null value is provided. "Auto Increment" specifies that the column should increment by an increment value with every insertion. The default seed value is 0 and the default increment is 1.

"Primary" indicates that the corresponding column will have enforced uniqueness and can be referenced by a foreign key. In some embodiments, multiple primary keys cannot be specified in a single schema. "Foreign Key" provides a reference to another container's primary key.

In some embodiments, containers can be created to include additional system-defined columns, which can be referred to as shadow columns. In one embodiment, there are two shadow columns "sys_xact" and "sys_timestamp" which track the corresponding transaction identifier of the transaction that caused the insertion of a record and the timestamp at which the insertion occurred. The "sys_xact" column can be used to resolve concurrency conflicts and implement the four isolation levels: READ UNCOMMITTED, READ COMMITTED, REPEATABLE READ, and SERIALIZABLE. The "sys_timestamp" column can be used to rebuild past versions of the database and perform temporal queries.

Figure 3:
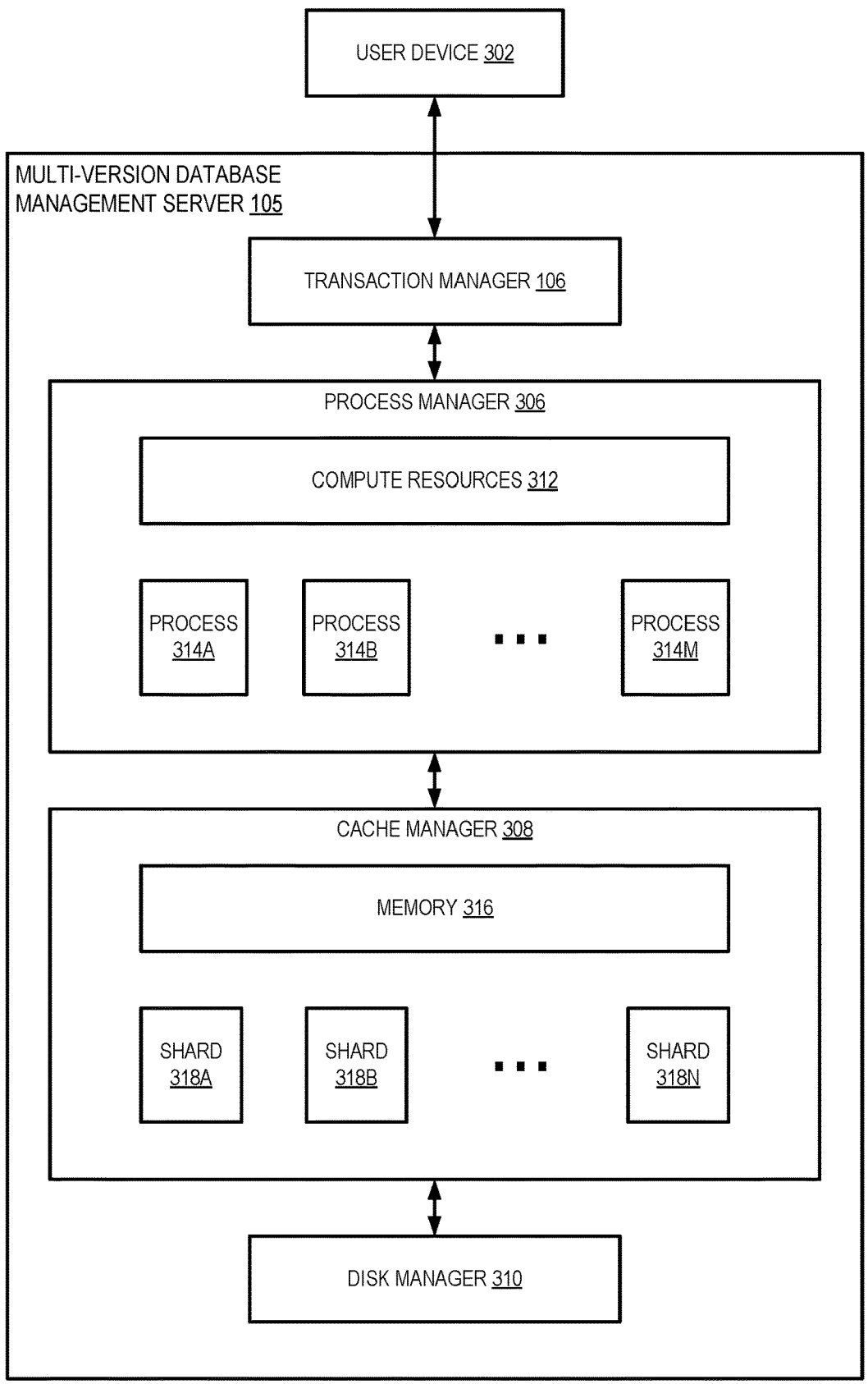
FIG. 3 illustrates an exemplary structure of a multi-version database management system according to an embodiment.

In some embodiments, the MDB management system includes an access management system for database securables (e.g., containers, blockchain containers, etc.) to create a secure bSQL development environment. In such embodiments, permissions can be granted on database securables to users and roles. Assigning users to custom roles can promote safe management practices, for example, by assigning the minimal number of permissions users need to perform their function. Access management can be performed using the bSQL language and commands can be formatted following SQL security commands V. Commands and Queries for Interacting with Containers FIG. 3 illustrates an exemplary structure of a multi-version database management system according to an embodiment. In one embodiment the MDB management server (e.g., the MDB management server 105) is designed around a funnel-based queuing methodology in which processes are broken down into a series of actions, executed, and reconstructed.

As illustrated in FIG. 3, a user device 302 interfaces with a transaction manager 106 of the MDB management server 105. For example, the user device 302 may interface with the transaction manager 106 using an application (e.g., browser) executing on the user device 302. Using the interface, the user device 302 can send requests (e.g., in the form of commands or queries) to the multi-version database management server 105. In some embodiments, the transaction manager 106 qualifies the requests to perform mutations, e.g., by validating permissions, and builds a corresponding list of actions. The actions can then be pushed down to the process manager 306. The process manager 306 can assign a process (e.g., process 314A, or one of processes 314B-M) to an individual action. As actions are executed by process 314A, the process manager 306 allocates part of the system's compute resources 312 to the specific process 314A.

In some embodiments, as process 314A executes its actions, it will read and write pages to and from disk. This enables the processes 314A to grab records and store mutations. In some embodiments, all I/O accesses are processed through the cache manager 308. In some embodiments, the cache manager 308 allocates memory 316 on the server. Memory 316 can be internally managed and distributed to shards 318A-N. In one embodiment, the shards 318A-N each access and reserve segments of memory 316 for transactions in a container. The shards 318A-N resolve concurrency conflicts between various transactions reading and writing to the same records. The shards 318A-N can append records to the end of the last page (in memory 316). In one embodiment, records are pushed down to the disk in bulk, making for more efficient I/Os.

Each shard 318A-N can manage the I/O communications between a single file on disk and the database. In one embodiment, each container takes up its own file and each index and meta data object takes additional files. Files can span multiple disk drives, but then shards are nested to abstract disk communication. Shards 318A-N can take in read and write requests. These requests search the memory 316. If the page is out of memory 316, it sends an allocate page request to the cache manager 308, which communicates directly with the disk manager 310 to grab the raw bytes from disk.

In one or more embodiments, processes 314A-M and shards 318A-N are container-specific, where each process executes actions received by the transaction manager 106 based on the corresponding container definition and protocol outline. Each container has corresponding shards. There are many different types of shards 318A-N. In some embodiments, each shard 318A-N can be of a different type.

a. bSQL Queries

In some embodiments, bSQL queries can be used to analyze, process, and aggregate datasets. While these queries can access additional multi-version data sources, the general structure of bSQL queries can be written and processed similarly to any traditional SQL query. For example, bSQL can support the majority of traditional query operations such as grouping, joins, and set semantics. In some embodiments, complex bSQL queries are optimized using a left-leaning optimal plan search.

Conventional databases are state driven, meaning that they are optimized for space and are designed to only store the current version of a record at a given time. In contrast, the MDB management system provides an abstraction in which users can analyze historical data, including utilizing time travel commands and capabilities. In some embodiments, the MDB management system allows for the performance of a range of analytics on data history, including, but not limited to, query data from a specific point in time, join past versions with current versions, audit the lifetime of a record, analyze how record mutations alter usage patterns, and understand user sessions within an application.

Another benefit of the MDB management system is a "time travel" capability that can allow all states of the database over time to be accessible to the user. The immutable aspect of the MDB management system allows bSQL queries to read from not only the current state of the database, but also access previous versions and data-rich record histories. In some embodiments, states can be aggregated to provide windows of data whose limits can be dictated by time or specific changes. The time travel capability of the MDB management system eliminates the need for users to take and store snapshots of the state of the database for later retrieval. Further, the time travel capability of the MDB management system can also provide greater insight into the state of the database at all times in the past, rather than being limited to snapshots whose insight are limited to state of the database at only the instances when snapshots were taken. By providing additional data access without compromising traditional functionality, bSQL can provide users insight into the evolution of their stored data.

An example SELECT command that joins two tables on their IDs can be as follows:
SELECT * FROM LIFETIME container.name
JOIN secondary_source ON source_id = secondary_id;

The LIFETIME operation in bSQL reads from the record history of a container. The LIFETIME keyword modifies a container in the FROM clause and specifies that the entire record history will be accessed by the query. If there exists a lifetime index on the container, the record history will be read in sorted order from that index.

The JOIN clause is used to tell the database to select records from two separate tables and then combine based on a conditional Boolean expression. In the example above, the JOIN statement is joining between "secondary_source" and "container.name" on the id column.

Another example SELECT command can be as follows:
SELECT * FROM LIFETIME stations
WHERE DISCONTINUED (stations);

The DISCONTINUED operation returns records that no longer exist in the current state of the container. It is a filter that is applied to the record history of that container. In the example above, only records that no longer exist in the "stations" container are returned.

Unlike DBMS, the MDB management system does not use snapshots. Because the MDB management system continuously tracks changes, users can read values from the database at any point in time. This reduces snapshot overhead and enhances the analytical capabilities of the system. By setting the TRANSACTION QUERY TIME, all subsequent queries use the lifetime index to generate the correct state. In some embodiments, a filter is applied to the iterator returning the records. While records are being streamed to the user, the iterator filters on the auto-generated timestamp column, looking for the first valid version. An example command is as follows:
SET TRANSACTION QUERY TIME "2021-02-26 00:07:10.000000000";
where the SET TRANSACTION syntax outline is as follows:
SET TRANSACTION <transaction_modifier>
<transaction_modifier> ::=
{
ISOLATION LEVEL <isolation>
| QUERY TIME <query_time>
}
<isolation> ::=
READ UNCOMMITTED
| READ COMMITTED
| SERIALIZABLE
<query_time> ::=
timestamp
| STATE The example command above simulates a snapshot taken at the time specified ("2021-02-26 00:07:10.000000000"). Values that were AMENDED or DISCONTINUED after the time specified will be restored and relational entities are guaranteed to hold.

The ISOLATION LEVEL clause modifies the current isolation level. Once the session has been modified, all transactions within the session will run using the specified isolation level. The default isolation is READ UNCOMMITTED. Additional isolation levels supported include READ COMMITTED, REPEATABLE READ, and SERIALIZABLE.

The QUERY TIME clause sets queries to run in a snapshot-like environment at the time specified. By establishing a time boundary using the QUERY TIME clause, subsequent queries of a container will return versions of records with timestamps up to the time boundary, and versions of records with values in their timestamp columns that are after the time boundary are filtered out.

The value of "timestamp" can be specified as a specific date and time in quotations or an expression that computes to a valid timestamp. The timestamp clause indicates the time to read from. The timestamp value can be specified as a timestamp in quotations (e.g., in UTC time format) or an expression that computes to a valid timestamp. The STATE clause specifies that queries should operate normally, on the current state of the system.

In some embodiments, every data page stores a cryptographic digest, which can be a value unique to the data stored on that page. The cryptographic digest for a page can be numeric value computed using a hash function and the data stored on the page. Users can run a command to easily verify that their data has not changed. This protects against attackers changing physical data on the page. The following command can be used to check the validity of a database:

CHECK VALIDITY;

Additionally, digests can be exported and distributed across technologies such as email, messaging services, and public blockchains. The following command can be used to export data digests:

READ DIGEST financial;

Once exported, users can validate the database using these distributed digests. Validating the database protects against authority-ordered illicit changes, for example, if an authority switches the database with a corrupt version with seemingly valid hashes corresponding to that version. The following command can be used to validate a database on exported digests:

VALIDATE DIGEST financial.pricing PATH "digests/may_5_digest.csv";

In some embodiments, the MDB management system utilizes an iterator-based approach to handling queries. In other embodiments, a channel-based approach is used for query processing. An iterator-based approach only processes the next record when called, while a channel-based approach continues to process the next records when waiting to be called. Channel-based approaches can be very beneficial for highly concurrent systems that have fast processes waiting for a slower processes to finish; in this case, the slow process will be called upon while the fast process preloads values. On the other hand, an iterator-based approach can be more beneficial for non-exhaustive iterators and more complex operations like joining and sorting, where records are not loaded sequentially.

b. bSQL Mutations

In some embodiments, bSQL mutations include INSERT, AMEND, and DISCONTINUE commands In some embodiments, because the MDB management system is an immutable system, these commands can be considered pseudo mutations because they are only modifying the current state of the database. These commands do not change or remove existing data in previous states. This means the data is continuously updating and evolving, and changes are tracked throughout the data lifecycle.

Some of the principles of bSQL mutations include the following: mutations are always fully logged, non-atomic mutations can be rolled-back in an open transaction, and bSQL mutations are indivisible and irreducible, preventing partial writes.

i. INSERT Mutation

The INSERT mutation adds one or more rows of data to a container. An example format of the command to perform an INSERT mutation can be as follows:

INSERT
{
<object>
{
  [ (column_list )]
  { VALUES ([ , . . . n]) [ , ([ , . . . n] ) . . . ]
}
[ <output_clause> ]
}
<object> ::=
{
database_name . container_name
| container_name
}
<output_clause> ::=
OUTPUT { column_name [ , . . . n] }

The "database_name" value is the name of the database, and the "container_name" value is the name of the container that is to receive data. The "column_list" clause is a list of one or more columns in which to insert data. In some embodiments, the system automatically provides a value for the column if the column: (a) has an autoincrement property, where the next incremented identity value is used; (b) has a default, where the default value is used; (3) has a timestamp data type, where the current timestamp value is used; or (4) is nullable, where the null value is used.

The "values" clause introduces the list or lists of data values to be inserted. In some embodiments, there must be one data value for each column in "column_list", if specified, or in the container. In the example above, the value list must be enclosed in parentheses. In some embodiments, if the values in the value list are not in the same order as the columns in the container or do not have a value for each column in the container, "column_list" is used to explicitly specify the column that stores each incoming value. In some embodiments, if the schema contains default, autoincrement, or null columns, the columns must be specified to avoid ambiguous insertions.

The "output" clause returns inserted rows as part of the insert operation.

An example INSERT command to insert a value into a container can be as follows:

INSERT employee_reference
VALUES ("john", "doe", 0);

This example inserts one row into the "employee_reference" container in a database. The columns in this container are first name, last name, and division. In this example, because values for all columns are supplied and are listed in the same order as the columns in the container, the column names do not have to be specified in the column list.

In another example where the values are not listed in the same order as the columns in the container, the "INSERT" clause would indicate the columns for data entry. An example is as follows:

INSERT employee_reference (last_name, first_name, division)
VALUES ("doe", "john", 0);

ii. AMEND Mutation

The AMEND mutation modifies a single record or set of records. An example format of the command to perform an AMEND mutation can be as follows:

AMEND
{
<object>
{
  { [ (column_list )]
  { VALUES ([ , . . . n] ) [ , ([ , . . . n]) . . . ]
  }
}
}

```
<object> ::=
{
database_name . container_name
| container_name
}
```
The clauses are similar to those in an INSERT command. The amend command inserts an updated record(s) into the corresponding container, updating the state of the environment.

An example AMEND command to amend a single record in a container can be as follows:
```
AMEND financial.pricing
VALUES ("MMM", 140, 2.06, 19.95, 6.72, 26.386, 102.89, 140.43);
```
This example command results in the values associated with the primary key "MMM" being replaced by the new record.

An example AMEND command to amend multiple records in a container can be as follows:
```
AMEND financial.pricing
VALUES ("MMM", 140, 2.06, 19.95, 6.72, 26.386, 102.89, 140.43), ("ABT", 40.0, 1.61, 24.48, 1.623, 16.259, 32.7, 40.49);
```
This example command updates the two records associated with the primary keys "MMM" and "ABT."

iii. DISCONTINUE Mutation

The DISCONTINUE mutation removes a single or set of records from the current state of a container. An example format of the command to perform an DISCONTINUE mutation can be as follows:
```
DISCONTINUE
{
<object>
{
  [ (column_list)]
  { VALUES ([ , . . . n] ) [ , ([ , . . . n] ) . . . ]
  }
}
}
<object> ::=
{
database_name . container_name
container_name
}
```
The clauses are similar to those in the INSERT and AMEND commands. The discontinue command inserts a tombstone record(s) and removes the record(s) from the state tree.

In one embodiment, the DISCONTINUE command may fail if it violates a trigger or tries to remove a row referenced by data in another table with a FOREIGN KEY constraint. If the DELETE removes multiple rows, and any one of the removed rows violates a trigger or constraint, the statement is canceled, an error is returned, and no rows are removed.

An example DISCONTINUE command to discontinue a single record in a container can be as follows:
```
DISCONTINUE financial.pricing
VALUES ("MMM");
```
This example command results in the values associated with the primary key "MMM" being removed from the state of the container. Multiple records can be removed by including additional primary keys in the VALUES clause.

Another DISCONTINUE command to discontinue data that is not in the same order as the container columns uses a column list to explicitly specify the value to be discontinued. As example command can be as follows:
```
DISCONTINUE financial.companies (sector, name)
VALUES ("Financials", "AIZ");
```

Each of the different container types of the MDB management system can process the bSQL mutations differently. For example, historical containers do not allow AMEND or DISCONTINUE commands In some embodiments, a historical container is a bare-boned ledger, stripped of indexes and primary key constraints. In some embodiments, mutations can be processed quickly because data will always be written to the end of the historical container and no primary key checks are necessary.

| Container Type | Stage | INSERT | AMEND | DISCONTINUE |
| --- | --- | --- | --- | --- |
| Historical | Mutation Checks | Basic schema check | X | X |
| | Mutation Actions | Append the record to the shard. | X | X |
| | Post-Mutation | Archive pages if applicable. | X | X |

Historical(+) containers allow both AMEND and DISCONTINUE commands Historical(+) containers use a primary key, secondary index to keep track of the current state of the container. In some embodiments, because the indexes do not keep track of the record histories, Historical(+) containers can be more space efficient than the Traditional containers.

| Container Type | Stage | INSERT | AMEND | DISCONTINUE |
| --- | --- | --- | --- | --- |
| Historical(+) | Mutation Checks | Basic schema check | Basic schema check | Basic schema check, generate tombstone record |
| | Mutation Actions | Append the record to the shard. Add the record ID to the primary key index, checking for uniqueness. | Append the record to the shard. Update the record ID primary key index, checking the old value exists. | Append a tombstone record to the shard. Update the record ID primary key index, checking the old value exists. |
| | Post-Mutation | Archive pages if applicable, | Archive pages if applicable. | Archive pages if applicable. |

Traditional containers use a primary key, secondary index to keep track of all blockchain states. This adds extra data pages to the system called cluster pages. ROLLBACK, SET TRANSACTION, and TIME-TRAVEL QUERIES benefit greatly from rapid access to record histories.

Figure 4:
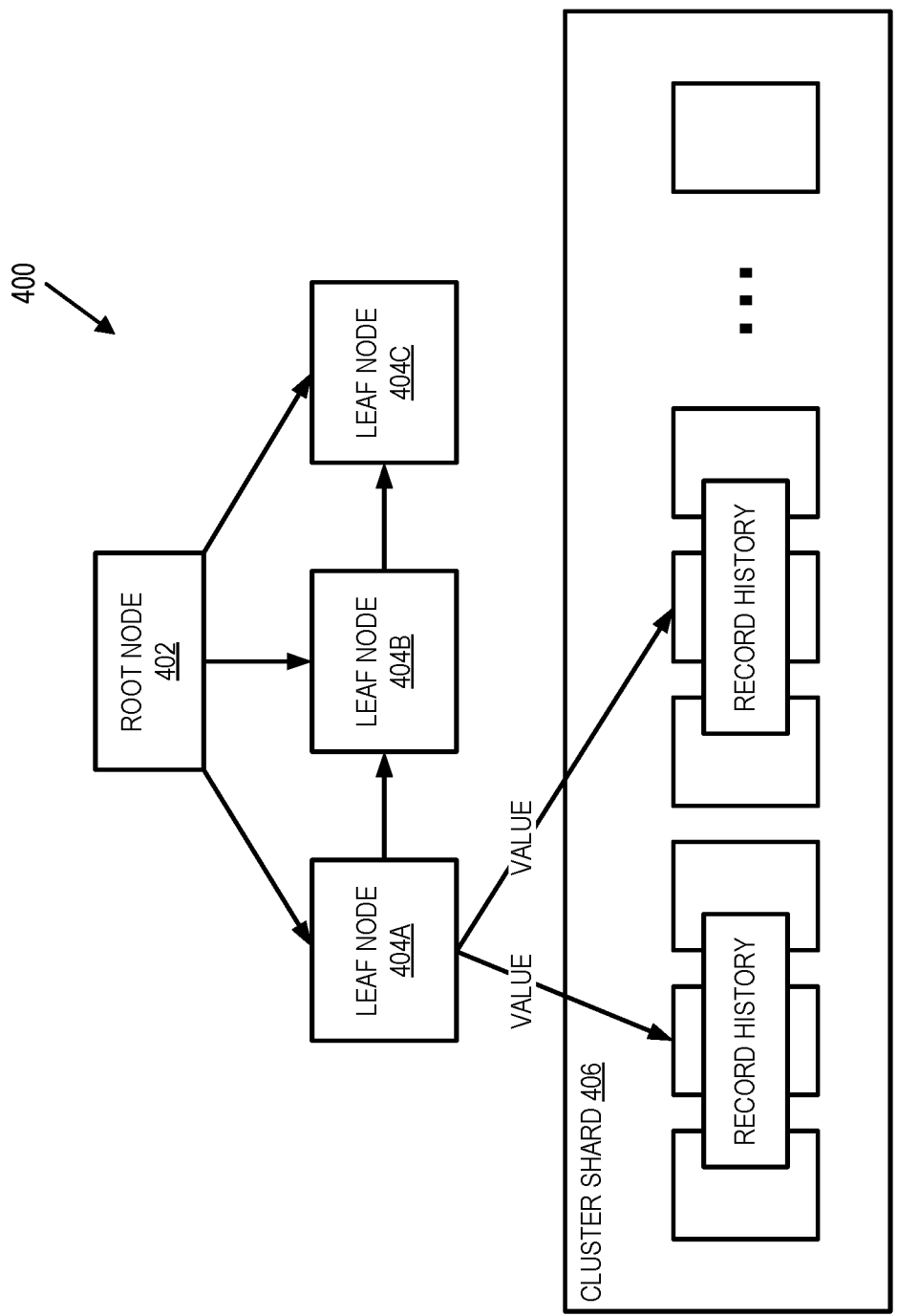
FIG. 4 illustrates a tree structure of unique keys inside a container according to an embodiment.

FIG. 4, the tree structure 400 includes a root node 402, leaf nodes 404A-C, and a cluster shard 406. The multi-version B+ tree can provide a means to quickly search for a set of

| Container Type | Stage | INSERT | AMEND | DISCONTINUE |
|---|---|---|---|---|
| Traditional | Mutation Checks | Basic schema check | Basic schema check | Basic schema check, generate tombstone record |
| | Mutation Actions | Append the record to the shard. Add the record ID to the primary key index. If the record was discontinued, add to the end of the corresponding cluster page and update the leaf. | Append the record to the shard. Add the record ID to the primary key index, the end of the corresponding cluster page and update the leaf. | Append a tombstone record to the shard. Add its record ID to the primary key index, the end of the corresponding cluster page and update the leaf. |
| | Post-Mutation | Archive pages if applicable, | Archive pages if applicable. | Archive pages if applicable. |

Sparse containers use the same multi-version index used by the traditional containers. In embodiments, the key difference between the two is how data is stored on the data page. For example, in a traditional container, the entire record is stored on the page, while in a sparse container, the differential is stored (e.g., updated data can be inferred from its previous value and only changes are stored). For example, the following is a mutation performed on a sparse container.

INSERT example VALUES (1, 2, 3, 4);
AMEND example (first_column) VALUES (100);

The result of executing this command would be that, in order, <1, 2, 3, 4> and <100> would be stored on the data page. When reading the full record, the two records are merged and resemble <100, 2, 3, 4>.

cluster pages linked to the provided key from a cluster shard 406. The cluster shard 406 is an extension of the leaf nodes 404A-C and manages the division of cluster pages across keys. On a leaf, a single key is mapped to both a record id and a cluster page id and managed by the cluster shard 406. The indexes map a given key to two locations: (1) the record id to the location of the state value in the container (e.g., the location of the most up-to-date record), and (2) the cluster page id to the list of record historical values in the cluster shard 406.

In some embodiments, when a key is requested, the tree structure 400 is traversed starting at the root node 402 and ending at the corresponding leaf node (e.g., leaf node 404A) that stores the range of values in which that key belongs. When reading from the current state, no cluster pages are

| Container Type | Stage | INSERT | AMEND | DISCONTINUE |
|---|---|---|---|---|
| Sparse | Mutation Checks | Basic schema check, do not generate values unless specified. | Basic schema check, do not generate values unless specified. | Basic schema check, generate tombstone record |
| | Mutation Actions | Append the partial record to the shard. Add the record ID to the primary key index. If the record was discontinued, add to the end of the corresponding cluster page and update the leaf. | Append the record to the shard. Add the record ID to the primary key index, the end of the corresponding cluster page and update the leaf. | Append a tombstone record to the shard. Add its record ID to the primary key index, the end of the corresponding cluster page and update the leaf. |
| | Post-Mutation | Archive pages if applicable, | Archive pages if applicable. | Archive pages if applicable. |

FIG. 4 illustrates a tree structure 400 of unique keys inside a container according to an embodiment. These keys are a subset of values in a record that correspond to a subset of columns in the container schema. An index key can be a list of n values (where n<=the number of columns in the container schema). Specifically, the tree structure 400 represents a multi-version B+ tree for optimizing the retrieval of primary-key dependent record histories. In some embodiment, the multi-version B+ tree is a hybridization between a traditional B+ tree and a cluster shard. As illustrated in loaded into memory. Instead, when the user accesses the record history of a container, a key's cluster pages are loaded into memory and returned. In some embodiments, the key is a primary key. The cluster pages can hold the history of mutations associated with the corresponding key. The B+ tree can provide an I/O-efficient means of accessing an individual key, or range of sequential keys, and the cluster pages can provide a means of consolidating multi-version record histories into a series of sequential pages. Traditional DBMS pack and re-order records in pages to align them with indexes. The Multi-Version Cluster index provides a means of getting sequential I/O accesses in a multi-version append only system.

In some embodiments, primary keys are used to keep track of unique data and provide a reference point when updating a value. In the MDB management server, primary keys can serve as a means of identifying past versions of records, allowing for the accurate representation of different states of the system. Additionally, the MDB management server can store metadata to track the states and lifetimes of these records. This metadata can ensure that queries to the current state are not impacted by record history and history is easily accessible.

Figure 5:
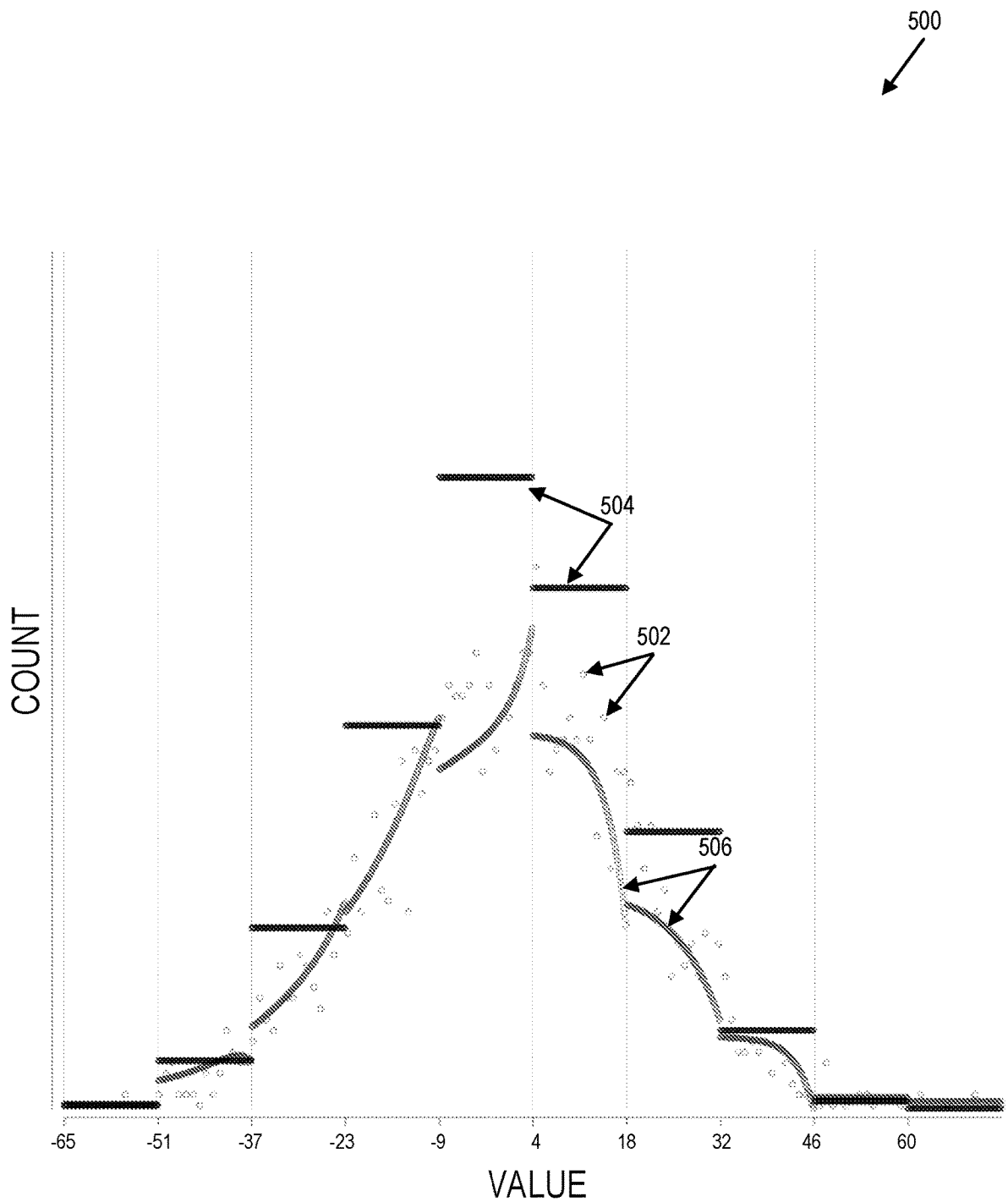
FIG. 5 is a chart illustrating data statistics of the distribution of values in a column within a container according to an embodiment.

FIG. 5 is a chart illustrating data statistics of the distribution of values in a column within a container according to an embodiment. The chart can be used to perform cardinality estimations on the existence of a value or range of values of an individual column within the container. This chart can provide estimations that can be used to optimize queries to the database. In some embodiments, the MDB management system generates statistics on the data in a container. In a container, a single column of data may have values that overlap. In FIG. 5, the chart 500 illustrates a plot of normally distributed data represented by circles (e.g., data points 502), a representation of the data using a histogram (e.g., label 504), and a representation of the data using a histogram whose buckets run ridge regression (e.g., label 506). In some embodiment, using buckets with ridge regression and provide a better estimate of the cardinality of a given value. The x-axis represents the value, while the y-axis represents the count of the number of times that value appears in the column.

In some embodiments, the MDB management system builds histograms that are specific to column constraints and data types. In one embodiment, the MDB management system includes five different types of buckets in the statistics operator: unique, base, regression, outlier, and boolean. The "unique bucket" can model records that have unique constraints; tracking record value distribution, not quantity. The "base bucket" can track record distribution and quantity; it estimates basic cardinalities and reduces the overhead for internal optimization and query planning. The "regression bucket" can use quantitative processes to model record distribution and reduce storage overhead; it can be used in ranges with large record counts. The "outlier bucket" models a traditional histogram bucket; it is used to hold a series of outliers in ranges that cannot be regressed due to their lack of data. The "boolean bucket" simplifies storing enumerated types.

In one embodiment, statistics can be used to represent the distribution of values in a container and consequently increase the accuracy of the query optimizer when searching for optimal query plans. In some embodiments, bSQL statistics have the following features: flexible, reliably accurate, buildable, serializable, and optional. As to flexibility, histograms can be built differently depending on their data type and distribution. For instance, statistics on a numeric column are built using k-fold cross validation and update continuously using a modified gradient descent algorithm, as illustrated in FIG. 5. As to accuracy, container mutations can atomically update the blockchain statistics to represent the updated distribution without losing a significant amount of accuracy. As to buildability, during database downtime bSQL can use a various data collection and modeling techniques to refresh statistics and build accurate blockchain statistics. In some embodiments, this feature can be accessed by running a "BUILD STATS" command. As to serializability, in embodiments, bSQL statistics persist after a database failure and do not need to be manually rebuilt. Further, bSQL statistics are container-specific and optional. For example, if a container is rarely used for complex queries, dropping statistics can reduce storage usage.

Figure 6:
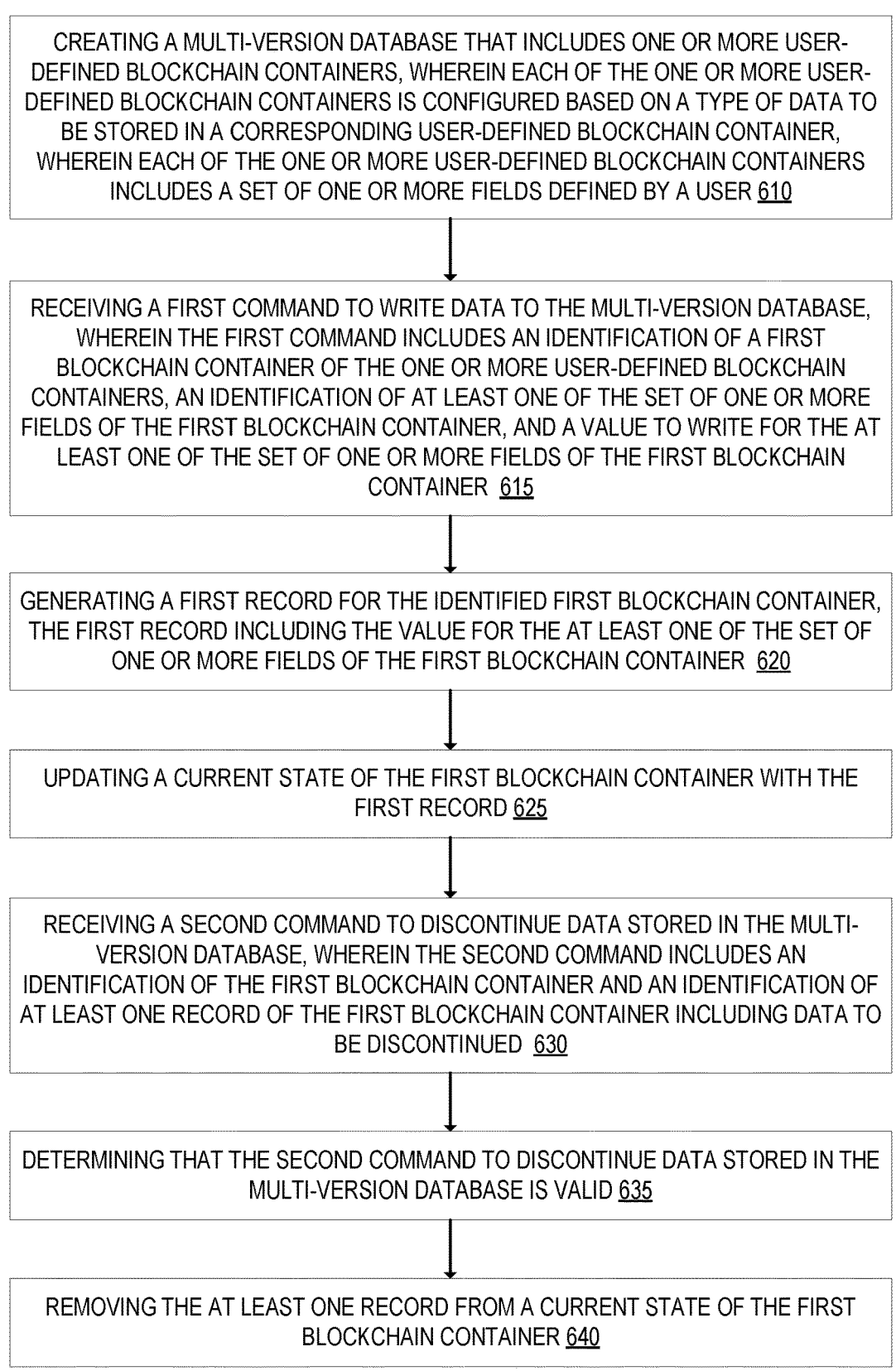
FIG. 6 is a flow diagram that illustrates exemplary operations for a multi-version database management system according to an embodiment.

FIG. 6 is a flow diagram that illustrates exemplary operations for a multi-version database management system according to an embodiment. The operations of FIG. 6 will be described with reference to the exemplary embodiment of the other figures. However, it should be understood that the operations of FIG. 6 can be performed by embodiments of the invention other than those discussed with reference to the other figures, and the embodiments discussed with reference to the other figures can perform operations different than those discussed with reference to FIG. 6. The operations of FIG. 6 are described as being performed by the multi-version database (MDB) management server 105.

At operation 610, the MDB management server 105 creates a multi-version database that includes one or more user-defined blockchain containers, where each of the one or more user-defined blockchain containers is a data structure configured based on a type of data to be stored in a corresponding user-defined blockchain container, and where each of the one or more user-defined blockchain containers includes a set of one or more fields defined by a user. For example, the MDB management server 105 receives user configuration data from a user computing device (e.g., user device 110A). In one embodiment, the user configuration data indicates the different objects and data structures that are to be stored in the multi-version database. In one embodiment, the user configuration data includes at least one blockchain container type. For example, the blockchain container types can include the following types: historical, historical plus, traditional, and sparse.

In one embodiment, an example command to create a blockchain container (e.g., an MDB management system database object) can be as follows:

CREATE CONTAINER
{ database_name.container_name | container_name},
<container_type> [BLOCKCHAIN] [WITHOUT STATS]
({ <column_definition> } [ , . . . n] )
[ INDEX <index_definition> [ , . . . n] ] ]

In one embodiment, the "database_name" value is the is the name of the database in which the container is created. In some embodiments, "database_name" must specify the name of an existing database. In some embodiments, if not specified, "database_name" defaults to the current database. In one embodiment, the "container_name" value is the lowercase name of the new container and can be a maximum of 128 characters and cannot include spaces.

In one embodiment, the "container_type" value indicates the type of container to be created. In one embodiment, if a user does not specify a container type, the default is the historical blockchain container type.

In one embodiment, the container can be of class BLOCKCHAIN. Classes provide additional modularity to containers. In one embodiment, a container of the class type BLOCKCHAIN stores additional cryptographic meta data on pages to further secure and analyze the data. This meta data can include murkel tree-like structures that enable individual record validity checks, login signed records enforcement, and other safekeepings to ensure data provenance is maintained. In one embodiment, classes can be used to comply with various jurisdictions by automating various cryptographic procedures for anonymizing, verifying, making immutable, etc.

In one embodiment, the syntax of "<column_definition>" is as follows:

<column_definition> ::=
{column_name <data_type>} | {TIMESTAMP}
[PACKED [= <bool>] | PADDED [= <bool>]]
[NULLABLE [= <bool>] ]
[ DEFAULT [VALUE]= default_value]
[ ENCRYPT="key_name" ]
[ TRACK VALIDITY='["key_name", validity_level']']
[ <column_constraint> [ , . . . n] ]
[ CHECK '['logical_expression']']
[ COMPUTED '['computed_expression']']

In one embodiment, "column_name" is the reference name for the column In one embodiment, this value much be unique within a blockchain and cannot contain spaces.

In one embodiment, "data_type" indicates the type of data for this column to store.

In one embodiment, "timestamp" generates a column definition with the name "timestamp" whose values are stored as the current time when the record was inserted.

In one embodiment, "packed" specifies that the values inserted into this column do not span their default size. Instead, they are packed and pointers to their start and end are stored in a footer.

In one embodiment, "padded" specifies that the values inserted into this column span their default size and no footer exists.

In one embodiment, "nullable" specifies that when a record is inserted into the blockchain, if there is no value that corresponds to the nullable column, the null value is provided. In one embodiment, any data type that allows packed values, must be packed in order for the value to be nullable. In some embodiments, when column nullability is not explicitly specified, it defaults to false.

In one embodiment, "default" specifies the value provided for the column when a value is not explicitly supplied during an insert. In one embodiment, "default_value" specifies the value to be set as the default. This value should be compatible with the data type specified for its corresponding column In some embodiments, a column can have only one DEFAULT definition. In some embodiments, a "default" definition can only contain constant values.

In one embodiment, "encrypt" specifies that a column will be encrypted, with the "key_name" indicating the name of the encryption key used to encrypt this column In one embodiment, "track validity" specifies that the column will check for corrupted data. In one embodiment, "key_name" indicates the name of the encryption key used to track the validity of the column. The "validity level" can be level one (e.g., a smaller validity tracking method) or level two (e.g., a larger validity tracking method).

In one embodiment, "check" dictates that this column will enforce a blockchain-specific logical expression.

In one embodiment, the syntax of "<column_constraint>" is as follows:

<column_constraint> ::=
{ { PRIMARY KEY | UNIQUE}
[ AUTO INCREMENT ['['seed, increment']']]
| [ FOREIGN KEY]
'[' database_name.container_reference | container_reference column_reference']'
[ ON UPDATE '{' NO ACTION | CASCADE | SET NULL | SET DEFAULT'}' ]
[ ON DELETE '{' NO ACTION | CASCADE | SET NULL | SET DEFAULT'}' ]
| [ HISTORICAL REFERENCE]
'[' database_name.container_reference | container_reference column_reference']'
}

In one embodiment, "primary key" is a constraint that asserts uniqueness for a specified column through a primary key index. A container can only have one primary key constraint.

In one embodiment, the primary key constraint can be referenced by a foreign key constraint in another container.

In one embodiment, the primary key constraint can be referenced by a historical reference constraint in another container.

In one embodiment, "foreign key" is a constraint that asserts the specified value exists as a primary key in the corresponding container upon insertion, and throughout the existence of the record. The foreign key constraint references the corresponding primary key index to validate the existence of the record.

In one embodiment, "unique" is a constraint that asserts uniqueness for a specified column through a unique index and allows null values. A blockchain can have multiple unique constraints.

In one embodiment, "historical references", is a constraint that asserts the specified value exists as a primary key in the corresponding container upon insertion. The historical reference constraint references the corresponding primary key index to validate the existence of the record.

The MDB management server 105 generates the multi-version database, including at least one container of the container type indicated in the received user configuration data. In some embodiments, the system creates the containers (e.g., blockchains, tables) based on the user configuration data. Once the containers are created, the MDB management server 105 assigns the appropriate protocols and workflows for handling mutations and read-based commands based on the container type.

At operation 615, the MDB management server 105 receives a first command to write data to the multi-version database. The first command can include an identification of a first blockchain container of the one or more user-defined blockchain containers to which the data will be written, an identification of at least one of the set of one or more fields of the first blockchain container, and a value to write for the at least one of the set of one or more fields of the first blockchain container. For example, the first command can be an INSERT command for submitting a new record to the first blockchain container (e.g., adding one or more rows of data to the first blockchain container).

The following example inserts one row into the "financial.companies" container. The fields/columns in this container are "symbol", "name", and "sector".

INSERT financial.companies
VALUES ("WPG", "Washington Prime Group", "Trust");
In this example, because the values for all fields/columns are supplied and are listed in the same order as the fields/columns in the container, the fields/columns names do not have to be specified in the column list.

At operation 620, the MDB management server 105 generates a first record for the identified first blockchain container, the first record including the value for the at least one of the set of one or more fields of the first blockchain container. Continuing the example above, the MDB management server 105 generates a new record that includes at least the values for the three fields "symbol", "name", and "sector".

At operation 625, the MDB management server 105 updates a current state of the first blockchain container with the first record. In one or more embodiments, the current state of the first blockchain container is updated by the insertion of the first record into the first blockchain container. The first record includes a timestamp indicating the date and time the first record was adding to the first blockchain container. The first record also includes a transaction id, "xact_id", that is used to enforce various isolation levels and perform recovery operations. When the first record is added into the first blockchain container, it can undergo a series of validations to ensure it complies with all the constraints and definitions of the container schema. This can include a unique constraint in which the transaction would have to first verify that the constrained column in the first record is unique relative to the other records in the first blockchain container.

At operation 630, the MDB management server 105 receives a second command to discontinue data stored in the multi-version database, where the second command includes an identification of the first blockchain container and an identification of at least one record of the first blockchain container including data to be discontinued. For example, the second command can be a DISCONTINUE command for removing a single record or a set of records from the current state of the first blockchain container.

The following example removes one record/row from the "financial.companies" container.

DISCONTINUE financial.companies (symbol)
VALUES ("ZION");

In this example, the command requests that the record having the value "ZION" in the "symbol" field/column be removed from the current state of the "financial.companies" container.

At operation 635, the MDB management server 105 determines that the second command to discontinue data stored in the multi-version database is valid. In some embodiments, to determine whether the discontinue data process is valid, the MDB management server 105 determines whether the container type of the first blockchain container permits discontinuation of data in the first blockchain container. For example, the historical container type does not allow the discontinuation of data. If the container does not permit the discontinuation of data, the discontinue data process is terminated. If the container type of the first blockchain container permits the discontinuation of data, the MDB management server 105 determines whether the data to be discontinued is referenced by data in a second blockchain container. If the data to be discontinued is referenced by data in a second blockchain container, the discontinue data process is terminated.

At operation 640, the MDB management server 105 removes the at least one record from the current state of the first blockchain container. In some embodiments, the MDB management server 105 inserts a tombstone record (e.g., a record with a NULL value) for the discontinued record in the first blockchain container.

In some embodiments, the MDB management server 105 receives a third command requesting to amend data stored in the multi-version database. In such embodiments, the third command includes an identification of the first blockchain container, an identification of at least one record stored in the first blockchain container that includes the data to be amended, and at least one updated value corresponding to a field/column in the at least one record. In response to receiving the third command, the MDB management server 105 generates a new record for the identified first blockchain container, the new record including the updated value for the MDB management server 105. The MDB management server 105 then updates a current state of the first blockchain container with the second record. When a record is amended and the second record is added into the first blockchain, it undergoes a series of validations to ensure it complies with all the constraints and definitions of the blockchain container schema. This can include a unique constraint in which the transaction would have to first verify that the constrained column in the second record is unique relative to the other records in the first blockchain container. After validating the constraints attached to the first blockchain container, the MDB management server 105 changes the index values that correspond to the first record to index values that correspond to the second record.

Figure 7:
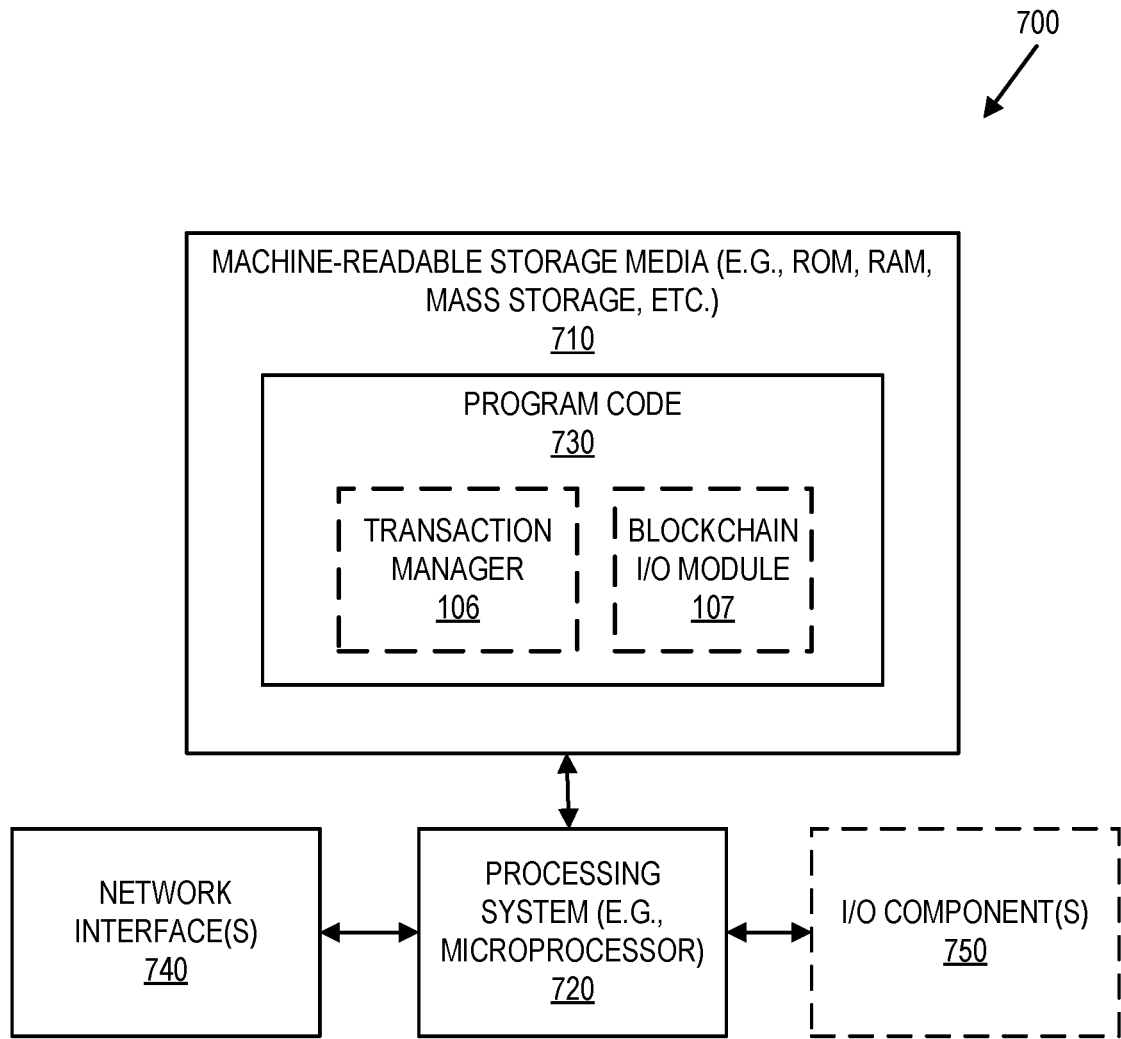
FIG. 7 is a block diagram for an exemplary data processing system that can be used in some embodiments.

FIG. 7 illustrates a block diagram for an exemplary data processing system 700 that may be used in some embodiments. One or more such data processing systems 700 may be utilized to implement the embodiments and operations described with respect to the multi-version database (MDB) management server 105 or other computing devices. The data processing system 7000 is a computing device that stores and transmits (internally and/or with other computing devices over a network) code (which is composed of software instructions and which is sometimes referred to as computer program code or a computer program) and/or data using machine-readable media (also called computer-readable media), such as machine-readable storage media 710 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processing system 720 (e.g., one or more processors and connected system components such as multiple connected chips). For example, the depicted machine-readable storage media 710 may store program code 730 that, when executed by the processor(s) 720, causes the data processing system 700 to perform any of the operations described herein.

The data processing system 700 also includes one or more network interfaces 740 (e.g., a wired and/or wireless interfaces) that allows the data processing system 700 to transmit data and receive data from other computing devices, typically across one or more networks (e.g., Local Area Networks (LANs), the Internet, etc.).

The data processing system 700 also includes one or more input or output ("I/O") components 750, which are provided to allow a user to provide input to, receive output from, and otherwise transfer data to and from the system. These I/O components 750 may include a mouse, keypad, keyboard, a touch panel or a multi-touch input panel, camera, frame grabber, optical scanner, an audio input/output subsystem (which may include a microphone and/or a speaker), other known I/O devices or a combination of such I/O devices. The one or more I/O components 750 may include wireless transceivers, such as an IEEE 802.11 transceiver, an infrared transceiver, a Bluetooth transceiver, a wireless cellular telephony transceiver (e.g., 2G, 3G, 4G, 5G), an NFC transceiver, or another wireless protocol to connect the data processing system 700 with another device, external component, or a network and receive stored instructions, data, tokens, etc.

Additional components, not shown, may also be part of the system 700, and, in certain embodiments, fewer components than that shown in FIG. 7 may also be used in a data processing system 700. One or more buses may be used to interconnect the various components shown in FIG. 7.

The techniques shown in the figures can be implemented using code and data stored and executed on one or more computing devices (e.g., client devices, servers, etc.). Such computing devices store and communicate (internally and/or with other computing devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

In the preceding description, numerous specific details are set forth. However, it is understood that embodiments of the invention may be practiced without these specific details. In other instances, well-known circuits, structures, and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the preceding description and the claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:
   creating a multi-version database that includes one or more user-defined blockchain containers, wherein each of the one or more user-defined blockchain containers is configured based on a type of data to be stored in a corresponding user-defined blockchain container, wherein each of the one or more user-defined blockchain containers includes a set of one or more fields defined by a user;
   receiving a first command to write data to the multi-version database, wherein the first command includes an identification of a first blockchain container of the one or more user-defined blockchain containers, an identification of at least one of the set of one or more fields of the first blockchain container, and a value to write for at least one of the set of one or more fields of the first blockchain container;
   generating a first record for the identified first blockchain container, the first record including the value for the least one of the set of one or more fields of the first blockchain container;
   updating a current state of the first blockchain container with the first record;
   receiving a second command to discontinue data stored in the multi-version database, wherein the second command includes an identification of the first blockchain container and an identification of at least one record of the first blockchain container including data to be discontinued;
   determining that the second command to discontinue data stored in the multi-version database is valid; and
   removing the at least one record of the first blockchain container from the current state of the first blockchain container.

2. The method of claim 1, further comprising:
   receiving a third command setting a transaction query time, wherein the transaction query time indicates a time boundary for subsequent queries;
   receiving a fourth command requesting a state of the first blockchain container;
   filtering records retrieved from the first blockchain container based on the transaction query time and timestamps associated with the records; and
   returning the state of the first blockchain container at the transaction query time including only versions of records whose timestamps indicate were stored in the first blockchain container prior to the time boundary.

3. The method of claim 1, wherein creating the multi-version database that includes the one or more user-defined blockchain containers comprises:
   for each of the one or more user-defined blockchain containers, configuring a user-defined blockchain container based on a container type and the set of one or more fields defined by the user.

4. The method of claim 3, wherein the container type is one of a historical type, a historical plus type, a traditional type, and a sparse type.

5. The method of claim 1, wherein determining that the second command to discontinue the data stored in the multi-version database is valid comprises:
   determining that a container type of the first blockchain container permits discontinuation of data in the first blockchain container; and determining that the at least one record of the first blockchain container including data to be discontinued is not referenced by data in a second blockchain container.

6. The method of claim 1, further comprising:
receiving a third command to amend data stored in the multi-version database, wherein the third command includes an identification of the first blockchain container, an identification of at least one record of the first blockchain container including data to be amended, and at least one updated value to write for at least one of the set of one or more fields of the first blockchain container; and
generating a second record for the identified first blockchain container, the second record including the updated value for the least one of the set of one or more fields of the first blockchain container; and
updating a current state of the first blockchain container with the second record.

7. The method of claim 1, further comprising:
inserting a tombstone record for the at least one record in the first blockchain container.

8. A non-transitory machine-readable storage medium that provides instructions that, when executed by a processor, cause said processor to perform operations comprising:
creating a multi-version database that includes one or more user-defined blockchain containers, wherein each of the one or more user-defined blockchain containers is configured based on a type of data to be stored in a corresponding user-defined blockchain container, wherein each of the one or more user-defined blockchain containers includes a set of one or more fields defined by a user;
receiving a first command to write data to the multi-version database, wherein the first command includes an identification of a first blockchain container of the one or more user-defined blockchain containers, an identification of at least one of the set of one or more fields of the first blockchain container, and a value to write for at least one of the set of one or more fields of the first blockchain container;
generating a first record for the identified first blockchain container, the first record including the value for the least one of the set of one or more fields of the first blockchain container;
updating a current state of the first blockchain container with the first record;
receiving a second command to discontinue data stored in the multi-version database, wherein the second command includes an identification of the first blockchain container and an identification of at least one record of the first blockchain container including data to be discontinued;
determining that the second command to discontinue data stored in the multi-version database is valid; and
removing the at least one record of the first blockchain container from the current state of the first blockchain container.

9. The non-transitory machine-readable storage medium of claim 8, wherein the operations further comprise:
receiving a third command setting a transaction query time, wherein the transaction query time indicates a time boundary for subsequent queries;
receiving a fourth command requesting a state of the first blockchain container;
filtering records retrieved from the first blockchain container based on the transaction query time and timestamps associated with the records; and
returning the state of the first blockchain container at the transaction query time including only versions of records whose timestamps indicate were stored in the first blockchain container prior to the time boundary.

10. The non-transitory machine-readable storage medium of claim 8, wherein creating the multi-version database that includes the one or more user-defined blockchain containers comprises:
for each of the one or more user-defined blockchain containers, configuring a user-defined blockchain container based on a container type and the set of one or more fields defined by the user.

11. The non-transitory machine-readable storage medium of claim 10, wherein the container type is one of a historical type, a historical plus type, a traditional type, and a sparse type.

12. The non-transitory machine-readable storage medium of claim 8, wherein determining that the second command to discontinue the data stored in the multi-version database is valid comprises:
determining that a container type of the first blockchain container permits discontinuation of data in the first blockchain container; and
determining that the at least one record of the first blockchain container including data to be discontinued is not referenced by data in a second blockchain container.

13. The non-transitory machine-readable storage medium of claim 8, wherein the operations further comprise:
receiving a third command to amend data stored in the multi-version database, wherein the third command includes an identification of the first blockchain container, an identification of at least one record of the first blockchain container including data to be amended, and at least one updated value to write for at least one of the set of one or more fields of the first blockchain container; and
generating a second record for the identified first blockchain container, the second record including the updated value for the least one of the set of one or more fields of the first blockchain container; and
updating a current state of the first blockchain container with the second record.

14. The non-transitory machine-readable storage medium of claim 8, wherein the operations further comprise:
inserting a tombstone record for the at least one record in the first blockchain container.

15. An apparatus, comprising:
a processor; and
a non-transitory machine-readable storage medium coupled with the processor that stores instructions that, when executed by the processor, cause said processor to perform the following operations:
create a multi-version database that includes one or more user-defined blockchain containers, wherein each of the one or more user-defined blockchain containers is configured based on a type of data to be stored in a corresponding user-defined blockchain container, wherein each of the one or more user-defined blockchain containers includes a set of one or more fields defined by a user;
receive a first command to write data to the multi-version database, wherein the first command includes an identification of a first blockchain container of the one or more user-defined blockchain containers, an identification of at least one of the set of one or more fields of the first blockchain container, and a value to write for at least one of the set of one or more fields of the first blockchain container;

generate a first record for the identified first blockchain container, the first record including the value for the least one of the set of one or more fields of the first blockchain container;

update a current state of the first blockchain container with the first record;

receive a second command to discontinue data stored in the multi-version database, wherein the second command includes an identification of the first blockchain container and an identification of at least one record of the first blockchain container including data to be discontinued;

determine that the second command to discontinue data stored in the multi-version database is valid; and remove the at least one record of the first blockchain container from the current state of the first blockchain container.

16. The apparatus of claim 15, wherein the instructions further cause said processor to perform the following:

receive a third command setting a transaction query time, wherein the transaction query time indicates a time boundary for subsequent queries;

receive a fourth command requesting a state of the first blockchain container;

filter records retrieved from the first blockchain container based on the transaction query time and timestamps associated with the records; and return the state of the first blockchain container at the transaction query time including only versions of records whose timestamps indicate were stored in the first blockchain container prior to the time boundary.

17. The apparatus of claim 15, wherein creating the multi-version database that includes the one or more user-defined blockchain containers further causes said processor to:

for each of the one or more user-defined blockchain containers, configure a user-defined blockchain container based on a container type and the set of one or more fields defined by the user.

18. The apparatus of claim 17, wherein the container type is one of a historical type, a historical plus type, a traditional type, and a sparse type.

19. The apparatus of claim 15, wherein determining that the second command to discontinue the data stored in the multi-version database is valid further causes said processor to:

determine that a container type of the first blockchain container permits discontinuation of data in the first blockchain container; and determine that the at least one record of the first blockchain container including data to be discontinued is not referenced by data in a second blockchain container.

20. The apparatus of claim 15, wherein the instructions further cause said processor to perform the following:

receive a third command to amend data stored in the multi-version database, wherein the third command includes an identification of the first blockchain container, an identification of at least one record of the first blockchain container including data to be amended, and at least one updated value to write for at least one of the set of one or more fields of the first blockchain container; and generate a second record for the identified first blockchain container, the second record including the updated value for the least one of the set of one or more fields of the first blockchain container; and update a current state of the first blockchain container with the second record.

21. The apparatus of claim 15, wherein the instructions further cause said processor to perform the following:

insert a tombstone record for the at least one record in the first blockchain container.

* * * * *